UNITED STATES PATENT OFFICE.

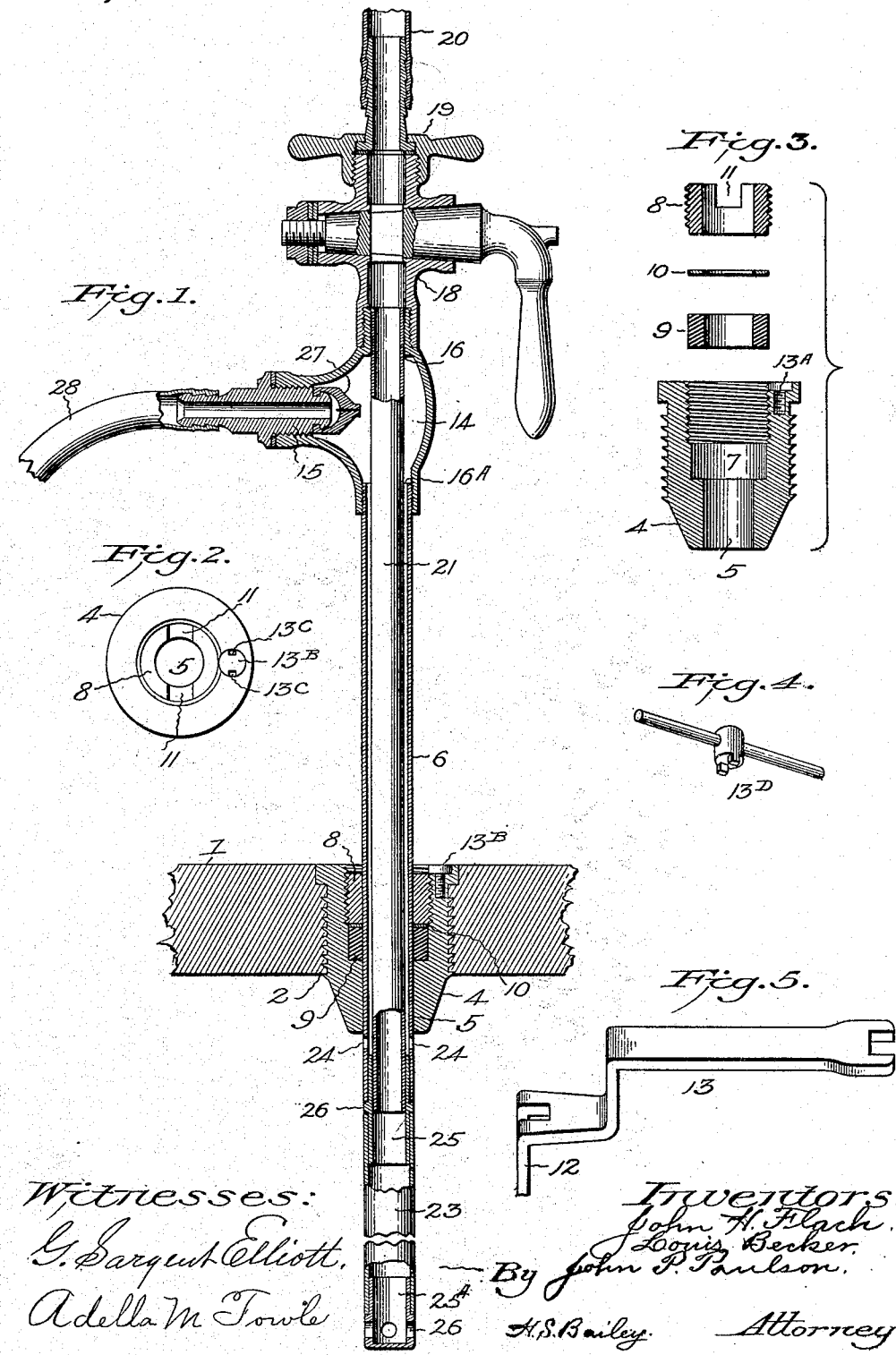

JOHN H. FLACH, LOUIS BECKER, AND JOHN P. PAULSON, OF DENVER, COLORADO.

AIR-INLET AND BEER-OUTLET BUNG-HOLE APPARATUS.

No. 911,225.      Specification of Letters Patent.      Patented Feb. 2, 1909.

Application filed December 7, 1907. Serial No. 405,612.

*To all whom it may concern:*

Be it known that we, JOHN H. FLACH, LOUIS BECKER, and JOHN P. PAULSON, citizens of the United States of America, residing in the city and county of Denver and State of Colorado, have invented a new and useful Air-Inlet and Beer-Outlet Bung-Hole Apparatus for Beer-Holding Barrels, of which the following is a specification.

Our invention relates to improvements in the compressed air inlet and beer outlet bung hole apparatus for beer holding barrels, and for other liquors that are kept on tap, and the objects of our invention are: First, to provide an improved adjustable air inlet and beer outlet removable bung for beer barrels of different capacity. Second, to provide a simple bung apparatus adapted to be threaded to the bung holes of barrels, and an improved air inlet and independent beer outlet valve-controlled pipe that is adapted to be adjustably set to reach the bottoms of barrels of different capacities. And third, to provide a simple, inexpensive, air inlet and beer drawing apparatus, that can be changed from one barrel to another, and in which the air and beer pipe holding and packing device is locked to the bung against intentional or accidental displacement. We attain these objects by the mechanism illustrated in the accompanying drawings, in which:

Figure 1, is a vertical, longitudinal, sectional view, illustrating the application of our improved air inlet and beer outlet bung hole apparatus. Fig. 2, is a front elevation of the improved bung. Fig. 3, is a sectional view of the several parts constituting the bung. Fig. 4, is a perspective view of the wrench used for removing the packing clamping nut which is threaded within the bung. And Fig. 5, is a perspective view of a device for removing the bung nut.

Similar letters of reference refer to similar parts throughout the several views.

Referring to the drawings, the numeral 1, designates a fragmentary part of the head of a beer barrel, which is provided with a bung hole 2, in which a thread is cut; a slight enlarged counterbore is also preferably formed at the entrance of the bung hole. In this bung hole we thread a bung 4, which is provided with a flange end that fits in the counterbore of the bung hole. This bung is provided with an axial aperture 5, which fits slidably a pipe 6, that extends slidably through the bung. This aperture is formed through the lower end of the bung, the upper portion being provided with a counterbore 7, the entrance to which is threaded, and a nut 8, is threaded to it; between the bottom of this nut and the bottom of the counterbore, we place a rubber washer 9, which rests on the bottom of the counterbore, and a metal washer 10, which is placed between the rubber washer and the bottom of the nut. This nut is also provided with an axial aperture that fits slidably the pipe 6. The nut is also provided with two diametrically formed slots 11, which extend from the periphery of its axial hole radially into its surface, and are adapted to receive the fingers 12 of a forked wrench 13, which are separated far enough apart to straddle the pipe 6.

The flange of the bung is provided with a threaded hole $13^A$, in which a large flat headed screw $13^B$ is threaded close enough to the inner peripheral threaded wall of the bung to permit the head to extend over onto and bear against the top of the nut. The head of the screw is provided with two side slots $13^C$, and a special form of spanner wrench $13^D$ is provided that fits into the side slots and is used to turn the screw into and out of the plug and against its nut. This screw cannot be removed from the bung and nut except with this special wrench, as its head is not provided with a screw-driver slot, and a screw-driver cannot be used to remove it.

The pipe 6, is extended through the bung a predetermined distance, which depends on whether it is to be applied to barrels, half barrels, or kegs, it being made to extend to the bottom of these sizes of barrels. This tube extends through and above the bung, and is threaded to a pipe tee fitting 14, to one of the end entrances of which it is threaded. This tee fitting 14, is of special construction interiorly and it contains an air entrance passage 15 at one side of its central portion between its ends, and outlets 16 and $16^A$ at its opposite ends. The outlet 16 is the beer outlet of the tee, and the outlet $16^A$ is the air outlet of the tee, and this air outlet is made enough larger than the beer outlet to receive an air inlet pipe that is enough larger than the beer outlet pipe to form an air passage within it around the beer outlet pipe. The beer outlet end of the tee 14 is exteriorly threaded, and a plug valve 18 is threaded to it, to the opposite end of which a hose coupling 19 is attached, to which one end of a hose 20 is secured, the opposite end of which extends to a beer tapping faucet. The beer discharging aperture in the beer discharging end of the tee 14, is interiorly threaded from its opposite end portion, and it is enough smaller than the air outlet aperture of the tee to allow a pipe 21, which we term the beer discharging pipe, to be extended into the tee through its air outlet aperture, and be threaded into it, and this beer discharging pipe extends from the air outlet aperture of the tee several inches, preferably about eight inches for beer kegs and ordinary sized barrels, although it may be made longer or shorter if desired. Consequently the upper end of the beer outlet pipe extends into and through the air outlet aperture and through the center of the tee past its central side air inlet aperture to the inside of its upper end portion, to which it is threaded, and the fluid passage aperture within the tee is of enough larger diameter than the beer outlet pipe to provide an ample air passage from the air inlet aperture through the tee to its air outlet aperture. The air supply pipe 6, is placed over the beer outlet pipe, and is of enough larger diameter than the beer pipe to allow an air passage within the air outlet pipe and around the beer outlet pipe, thus forming a continuous air passage from the air inlet aperture of the tee through the pipe 6, around the beer outlet pipe. This pipe extends over the whole length of the beer outlet pipe and beyond it a predetermined distance of several inches to a foot or more, depending on the size or depth of the barrel this tapping apparatus is applied to. The pipe 6 only acts as an air inlet pipe for a short portion of its length from the tee 14, the length of its air passage being made sufficient to allow it to extend above the bung a few inches and through and below the bung just far enough to extend through the head of the barrel into its interior, at which point a circumferential row of apertures 24 are formed through its shell, which form air discharging passages from the pipe into the beer or other barrel just below the bung and above the body of beer within the barrel or keg, as will be fully described hereinafter. And we preferably place these air outlet apertures close to but not quite to the end of the beer inlet pipe, which is also a short pipe of preferably but a trifle longer than the pipe 6, which surrounds it to the point where the air holes are formed. Upon the end of the beer outlet pipe, and within the air inlet pipe just below its air outlet discharge apertures, we form a smaller sleeve portion 25 which is fitted close to the outside surface of the beer outlet pipe and also within the inner surface of the air discharging pipe, and is then soldered or sweated or otherwise secured to both pipes. Consequently the passage between the inner beer outlet and the air inlet pipe is closed fluid tight at the air inlet portion of the pipe 6, and of the short inner beer outlet pipe; from this point the pipe extends beyond the short inner beer outlet pipe and forms the beer outlet pipe to its end, which is provided with a plug 25$^A$ that is soldered or otherwise secured to it, and a circumferential row of apertures 26 is formed through its shell, through which the beer flows into the interior of the tube.

While the pipe 6 may be made in one piece and the short inner beer outlet pipe be provided with an enlarged end portion or a collar or sleeve portion that can be soldered or sweated or otherwise secured to its interior to close the passage through this pipe at the end of the small inner beer pipe, as above described, we preferably make the pipe in two parts 6 and 23; the part 6 we term the air inlet pipe, and it extends to close to the end of the beer outlet pipe, and the sleeve is made independent of both pipes and is made to slip snugly over the end of the beer pipe and to fit snugly into the end of the air pipe, and a collar 26 is formed on the outside of the sleeve intermediate of its ends, that fits against the end of the air pipe and is of the same size as the air pipe, and the sleeve is made long enough to extend beyond its collar portion far enough to receive and support the other or lower portion 23 of the pipe. The sleeve and these three pipes are all soldered or sweated together so that the air passage within the pipe 6 and surrounding the small beer outlet pipe is closed and sealed at the terminal end portion of this inner beer outlet pipe, so that the beer that flows to this inner beer outlet pipe through the outer pipe 23 cannot enter the air passage within the pipe 6 and surrounding the tee 14.

To the air inlet aperture of the tee, an automatically operating rubber valve 27 is secured, which is of a type in use for this purpose, and does not form in itself a part of our invention. This air valve is connected by a hose 28, which leads to a hand or power air compressing pump, from which a supply of compressed air is fed through the rubber valve and tee and air pipe into the beer.

The operation is as follows: The bung is screwed into the threaded bung hole in a beer barrel, half barrel, or keg, and remains there permanently, the aperture 5 in the nut of the bung being closed by a cork to prevent the escape of the beer every time it is filled, and the barrel or keg is shipped to where the beer is to be tapped. Now when it is desired to tap the barrel, the nut 8 is loosened, and the combined air and beer tube 23 is pressed into the nut through the rubber washer and the bung so as to dislodge the cork, and the tube is pushed through until it rests on or close to the bottom of the barrel, half barrel, or keg, as the case may be, and as the length of this tube and its air holes have been made to fit full or half barrels or kegs, the tube is adjusted in the bung to bring the air holes just below the bung and close to it, either just above or at the top edge of the beer in the barrel or keg. The nut is then screwed against the rubber washer and compresses the rubber washer against the air tube, making an air and beer tight joint between the bung and the tube. A supply of compressed air is then connected to the air valve of the tee, and the air flows through the rubber valve 27 and the tee 14 and tube 6, and out of its air holes into the barrel or keg and beer, charging it with air until it has reached the desired pressure, and the beer under this pressure flows into the pipe 23 through the apertures 26, and through the small inner beer outlet pipe to the valve, and from the valve through the hose to the beer drawing spigot, where it is ready to be drawn when wanted. After the beer has been sufficiently charged with air, the connection with the supply is disconnected, and the rubber valve 27 is closed automatically by the back pressure of the air.

Our invention is simple, durable, and practicable, and can be interchanged from one barrel to another.

Having described our invention, what we claim as new and desire to secure by Letters Patent, is:

A combined air inlet and beer outlet apparatus for beer barrels, comprising a metal bung, a threaded chamber in said bung, a nut threaded in said chamber, a pliable washer in said chamber, wrench receiving sockets in said nut, an operative air inlet pipe slidably adjustable in said bung, a tee threaded at one end to the upper end of said air pipe, a beer pipe extending loosely enough through said air pipe to form an air passage within said air pipe around it, and threaded to the opposite end of said tee from said air pipe, a sleeve coupling provided with a central external annular shoulder arranged with one end extending into the air pipe and over said beer pipe and to abut with its shoulder against the end of said air pipe to close the space between said pipes, the opposite end of said sleeve extending below both pipes, and a second beer pipe connected to the lower end of said sleeve and abutting against its collar, a plug in the end of said second beer pipe, beer inlet apertures through said plug into said second beer pipe, an air outlet aperture in said air pipe adjacent to said sleeve coupling and between it and said bung, and an automatically operating valve connected to said tee between the adjacent ends of said air inlet and beer inlet pipes adapted to admit air to said air pipe.

In testimony whereof we affix our signatures in presence of two witnesses.

JOHN H. FLACH.
LOUIS BECKER.
JOHN P. PAULSON.

Witnesses:
G. SARGENT ELLIOTT,
E. MANSUR FOWLE.